March 31, 1953 A. J. ZAK 2,633,216
FLUID CLUTCH POWER TRANSMISSION
Filed Oct. 22, 1949 2 SHEETS—SHEET 1

INVENTOR
ALPHONSE J. ZAK

BY

ATTORNEYS

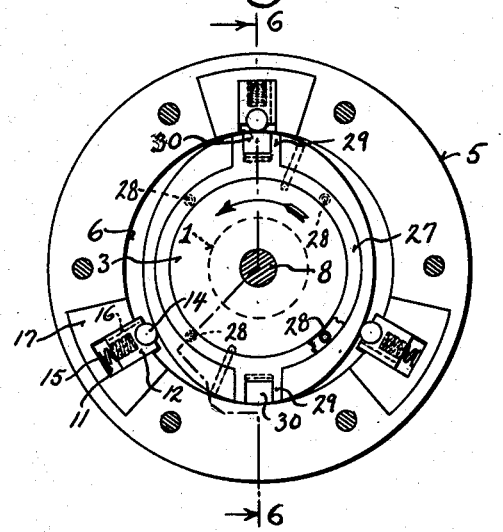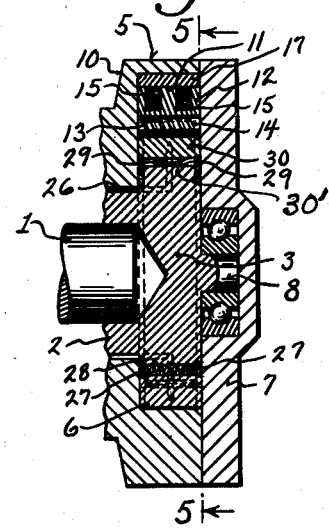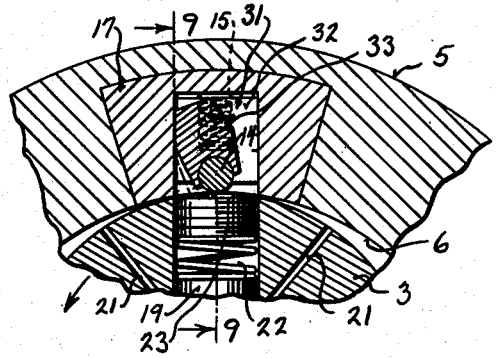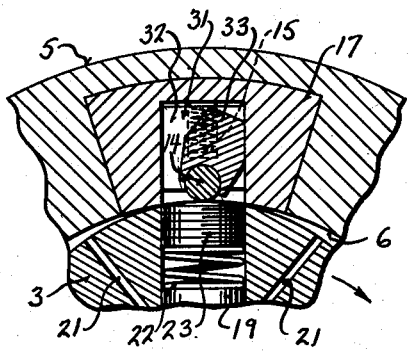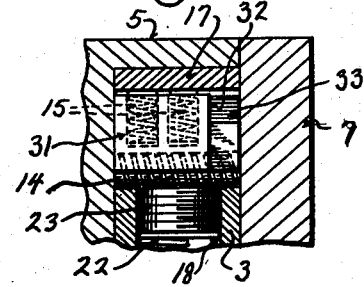

Patented Mar. 31, 1953

2,633,216

UNITED STATES PATENT OFFICE 2,633,216

FLUID CLUTCH POWER TRANSMISSION

Alphonse J. Zak, Milwaukee, Wis.

Application October 22, 1949, Serial No. 123,029

1 Claim. (Cl. 192—58)

My invention refers to fluid controlled clutches for transmitting power from a drive shaft to a driven unit or any type of machine.

The primary object of my invention is to provide a motor driven fluid clutch that upon its initial movement will yield or cushion the drive power imparted to a machine or other driven units, whereby as the speed of the machine gradually increases to a maximum, leakage of the fluid in the clutch will be cut off, and full power from the motor is imparted to the machine to eliminate sudden shock upon the motor and machine, due to full motor power being instantly transmitted thereto.

A specific object of my invention is to provide an elliptical driven head, having loosely mounted thereon a shell provided with a cylindrical chamber therein, whereby a series of fluid compartments of the chamber are formed, the same being provided with triple yieldable partitioned rollers carried by the driven shell and positioned at equal distances apart, whereby said shell with pairs of valve controlled bleeds will slip upon starting the motor.

Another object of my invention is to provide the high points of the elliptical head with spring controlled valves carrying pockets, the said pockets being interrupted by fluid bleeds communicating with the oil compartments, whereby slippage between the elliptical head and shell will result, to eliminate sudden full power being imparted to the shell or driven unit and avoid shock and damage to the motor or machine that is in gear connection with the clutch shell.

A still further object of my invention is to provide a thorough lubricating system for the clutch, comprising a pair of circular oil grooves in the faces of the elliptical head, the same having tangentially extended feed grooves to the periphery of the head, whereby distribution of a thin layer of lubricant is insured, it being understood that when the tangentially disposed oil grooves are employed in conjunction with the circular groove, that the eccentric driven head is adapted to rotate in one direction, which direction is opposite the point of discharge of the tangible grooves.

It is understood that while any suitable clutch fluid may be used, oil is preferably employed as the shock absorbent medium.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 5 is a face view of a modified form of my invention illustrating certain packing rings seated in the elliptical head, the section being indicated by line 5, 5 of Figure 6.

Figure 6 is a fragmentary sectional elevation of the same, the section being indicated by line 6, 6 of Figure 5.

Figure 7 is an enlarged fragmentary sectional face view of a modified form of partition rollers, whereby a rocking tooth is provided to permit rotation of the drive unit in either direction.

Figure 8 is a similar sectional face view showing the rocking tooth shifted in the opposite position from that shown in Figure 7; and Figure 9 is a longitudinal sectional view through the same, the section being indicated by line 9, 9 of Figure 7.

Figure 1:
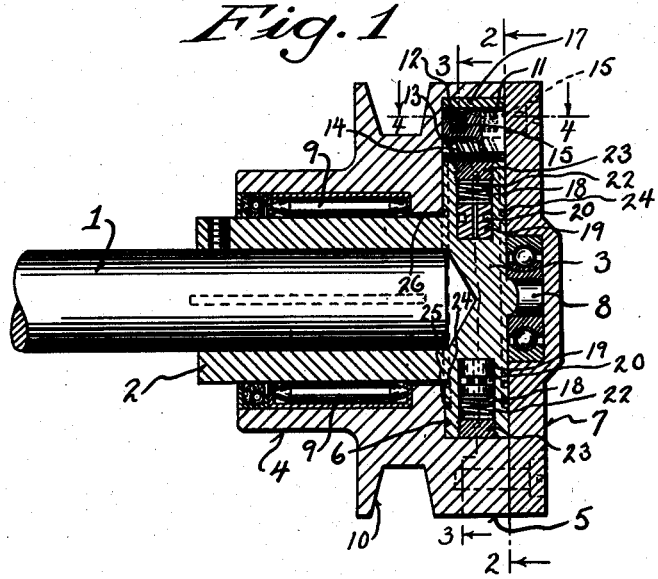
Figure 1 represents a sectional elevation of a fluid clutch embodying the features of my invention.

Referring by characters to the drawings, 1 indicates a motor driven power shaft having mounted upon its end the hub 2 of an eccentric head 3, which eccentric is in the form of an ellipse extending in opposite directions from the center of the shaft. Loosely mounted upon the elliptical head is the hub 4 of a driven shell 5, one end of said shell being formed with a circular chamber 6, into which the elliptical head is rotatably mounted.

The chamber portion of the shell is closed by a cap 7, and said cap carries a ball bearing mounted upon a stud 8 that extends from the center portion of the eccentric head 3. The hub 4 of the shell carries a roller bearing 9 which engages the hub 2 of said eccentric head, and said shell 5 is also provided with a pulley 10 for imparting power to a machine or other units, not shown.

It is understood that any suitable driving gear connection may be carried by the shell or the cap, as a substitute for the pulley.

Figure 2:
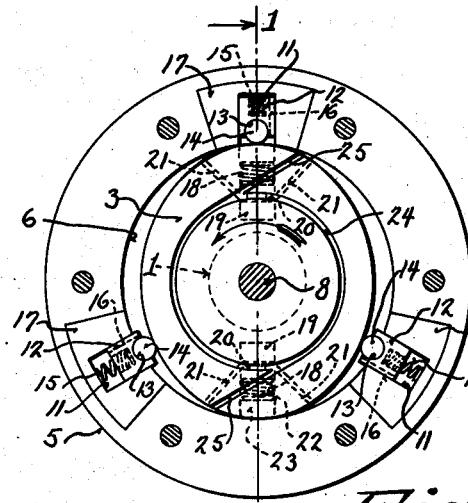
Figure 2 is a face view of the same partly in section as indicated by line 2, 2 of Figure 1.
Figure 3:
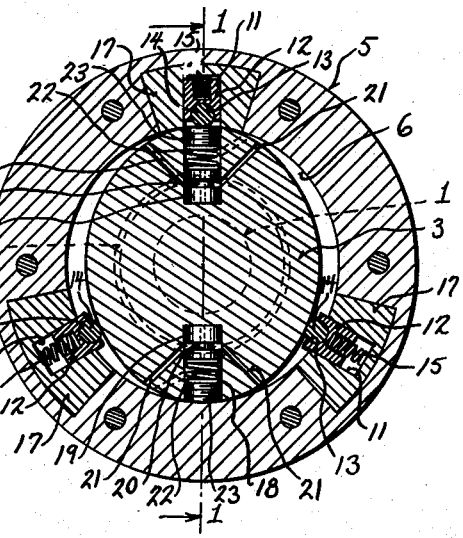
Figure 3 is another cross sectional face view, the section being indicated by line 3, 3 of Figure 1.

As best shown in Figures 2 and 3 of the drawings, the chambered portion of the shell 5 is provided with three radially disposed cavities 11, the same being positioned equal distances apart. Slidably mounted in the cavities are blocks 12, the inner ends of which blocks are provided with semi-circular seats 13 for the reception of partition rollers 14, which rollers engage the periphery of the eccentric head, the blocks 12, being forced inwardly by coil springs 15 which are interposed between the base of the cavities and the upper ends of said blocks.

It should be noted that the rollers 14 are provided with spiral gutters for lubricating purposes thereof.

Figure 4:
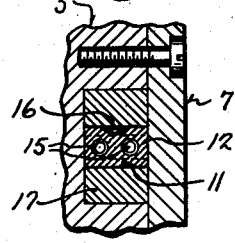
Figure 4 is an enlarged detailed sectional plan view illustrating one of the partition roller units, the section being indicated by line 4, 4 of Figure 1.

As indicated in dotted lines, Figure 2, and in full lines in Figure 4 of the drawings, the slidable blocks are provided with longitudinally disposed ducts 16, which ducts extend from end to end of the blocks upon one side face of the same, whereby communication is established between the shell chamber and the upper ends of the cavities 11, whereby oil from the circular chamber is directed above the blocks to balance and permit the same to readily reciprocate in the cavities.

Hence, it will be noted, the partition rollers 14 divide the circular chamber into three compartments that will be filled with oil or other fluid.

For convenience in manufacture and replacement, the blocked cavities 11 are formed in removable plates 17, which plates are dovetailed into the shell 3 and held in position by the cap 7.

The high points of the elliptical head are provided with aligned circular recesses 18, which recesses have mounted therein valve plugs 19, having annular grooves 20 therein. These valve grooves 20 normally establish communication between a pair of bleeds 21 that extend into the recesses 18 and are flared outwardly therefrom to the periphery of the elliptical head, whereby they communicate with the oil compartments of the shell chamber under valve control.

As best shown in Figure 3 of the drawings, when the high points of the elliptical head are in a vertical position, communication from the chamber compartments is established through the valve plug grooves 20, due to the fact that coil springs 22 interposed between the top of the valve plug 19 and a threaded shank 23 that serves as a closure for each recess 18.

Hence, it should be noted that the pairs of bleeds 21 will remain open with reference to the spring controlled valves, while the eccentric head is initially slowly rotated by the motor, and due to the leakage between the chamber compartments, the shell 5, which is in belt gear connection with a machine will slip, whereby said machine will receive its drive power gradually from the drive head, to eliminate shock in starting the motor and machine, whereby detrimental overloading of the motor is eliminated.

It will be noted, however, that when the speed of the driven head in a starting operation reaches its maximum, such high speed will cause the valve plugs to move out by centrifugal force, whereby the valves will cut off communication between its pair of bleeds 21 and thereby close the oil filled compartments of the chamber to cause both the drive and driven units to be clutched and revolved at the same speed.

In order to provide adequate lubrication for the clutch, as shown in Figure 2 of the drawings, the faces of the elliptical head are formed with circular grooves 24, which grooves communicate with tangentially disposed grooves 25 that extend outwardly to the periphery head, whereby communication is established to supply lubricating oil to both of the elliptical head faces.

As shown in Figure 1 of the drawings, the inner circular groove 24 also communicates with oil feed apertures 26, which apertures supply the roller bearings 4, whereby said assemblage is properly lubricated.

While I have illustrated my preferred form of elliptical head, it is apparent that said head may be of a common single eccentric type, in which case the shell would be provided with diametrically opposite partition rollers, whereby the chamber would be divided in two compartments, such modification being within the scope of my invention.

Referring particularly to Figures 5 and 6 of the drawings, the faces of the elliptical head have nested therein a pair of packing rings 27, which rings engage the bottom face of the shell channel and the inner face of the cap, being held snugly against said faces by coil springs 28, which pass through apertures in the head.

The rings are also provided with oppositely disposed projecting fingers 29, for the reception of a wear block 30, said blocks being seated in a transversely disposed recess of the head, and the blocks are forced against the peripheral surface of the shell chamber by a leaf spring 30', whereby a snug fit between the periphery of the chamber and the head is obtained. For the purpose of clarity, the bleeds 21, valve plugs 19, springs 22 and plug grooves 20 are not shown in Figures 5 and 6, but the same are associated with the elliptical head in the same manner as in Figures 1 to 3; except that the valve plugs 19 are located and chambered beneath the blocks 30.

Referring to Figures 7 to 9 inclusive, the elliptical drive head is arranged to rotate in either direction and with this in mind, the spring controlled blocks 31 are cut away at one end to form a space 32 between the block and end shell cap 7. The said space 32 is adapted to receive a rocking tooth 33, which is nested over the partition roller 14. Thus, the space 32 is open to receive a volume of oil from the shell chamber, whereby the block ends are properly lubricated and balanced, as noted in Figure 7. When the head is rotating in the direction of the arrow, Figure 7, the rocking tooth shifts forward upon the roller in the direction of rotation, and when the head is rotated in the reversed direction, as shown in Figure 8, the tooth by suction rocks in the opposite direction within the space 32, whereby a passage for the oil is maintained, irrespective of the direction of rotation, it being apparent with respect to Figures 1 to 4 inclusive that the direction of rotation of the head is directed from right to left, as indicated by the arrow in Figure 2.

It is apparent that the fluid clutch described may be supplied with pipe connections to its chamber compartments, whereby the clutch will function as a fluid pump, it being understood under such conditions, the chambered shell would remain fixed.

While I have specifically described the head as a drive member, it is understood the shell, in some cases, may be the drive member without departing from the spirit of my invention.

I claim:

In a fluid clutch, a power driven elliptical eccentric head, a shell loosely mounted upon the head having a circular chamber therein, a triple series of equally spaced cavities formed in the outer periphery of the shell communicating with the shell chamber, spring pressed rectangular slidable blocks mounted in the cavities, each block having a rounded seat in its chamber end, partition rollers nested in the block seats engaging the face of the elliptical head and dividing the chamber into three compartments, said elliptical head having a pair of bleeds on the opposite sides thereof communicating with the periphery thereof on opposite sides of its high points, and inwardly pressed spring controlled valves seated in the high points of the elliptical head between the bleeds of the pairs of bleeds for normally establishing communication between the bleeds of the pairs and for closing communication between the bleeds of the pairs upon outward movement of the valves under centrifugal force and against action of their springs whereby to confine the fluid in the chamber against movement to develop a positive clutch connection between the head and shell.

ALPHONSE JOS. ZAK.

REFERENCES CITED

The following references are of record in the file of this patent:

UNITED STATES PATENTS

| Number | Name | Date |
|---|---|---|
| 727,749 | Cook | May 12, 1903 |
| 887,781 | Fischer | May 19, 1908 |
| 972,693 | Harding | Oct. 11, 1910 |
| 1,186,132 | Rich | June 6, 1916 |
| 1,533,338 | Raynor | Apr. 14, 1925 |
| 1,816,735 | Magness et al. | July 28, 1931 |
| 2,355,773 | Zybach | Aug. 15, 1944 |
| 2,451,118 | Pyle | Oct. 12, 1948 |